United States Patent
Rieman

[15] 3,689,739
[45] Sept. 5, 1972

[54] CONTROL CIRCUIT
[72] Inventor: Willis E. Rieman, Skaneateles, N.Y.
[73] Assignee: Gulf & Western Industries Inc., New York, N.Y.
[22] Filed: Dec. 27, 1971
[21] Appl. No.: 212,016

[52] U.S. Cl..................................219/498, 219/519
[51] Int. Cl...........................................H05b 1/02
[58] Field of Search......219/494, 498, 501, 504, 505, 219/519

[56] References Cited
UNITED STATES PATENTS
3,349,223  10/1967  Barter....................219/501 X
3,427,436  2/1969  Finnegan..................219/501
3,571,565  3/1971  Hasler.....................219/501

Primary Examiner—Bernard A. Gilheany
Assistant Examiner—F. E. Bell
Attorney—Thomas E. Harrison, Jr. et al.

[57] ABSTRACT

A temperature sensitive responsive loop and a heater element control loop are functionally connected by a gate control loop combining to form a three loop temperature control circuit. The temperature sensitive responsive loop is magnetically coupled to the gate control which is coupled across a gate controlled switching element in the heater control loop.

3 Claims, 3 Drawing Figures

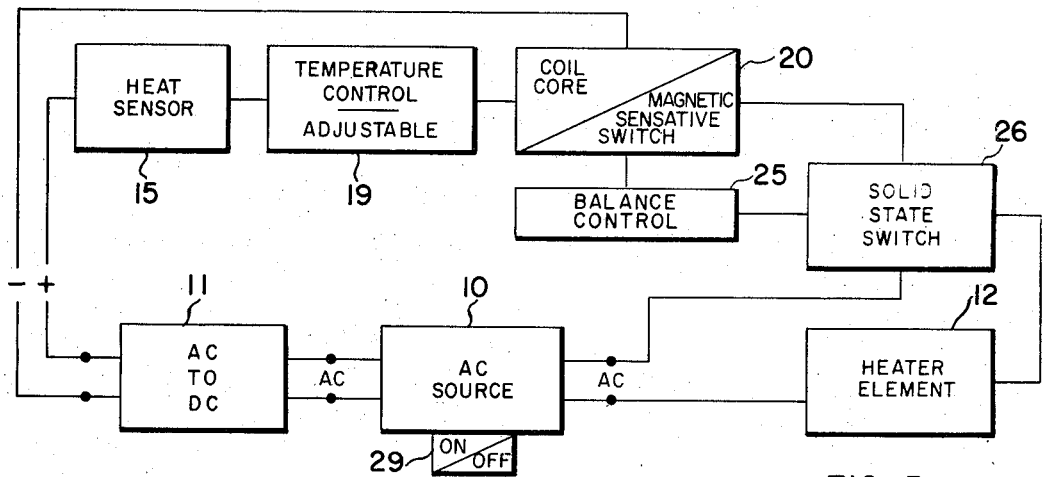
FIG. I
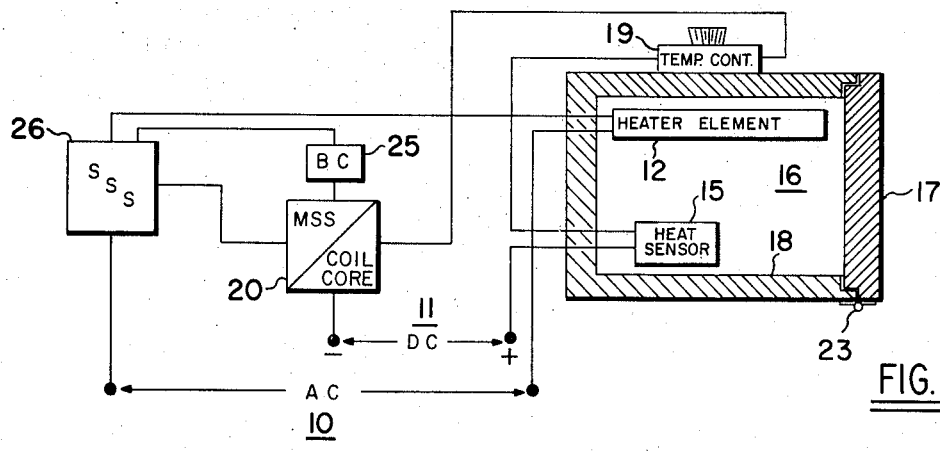
FIG. II
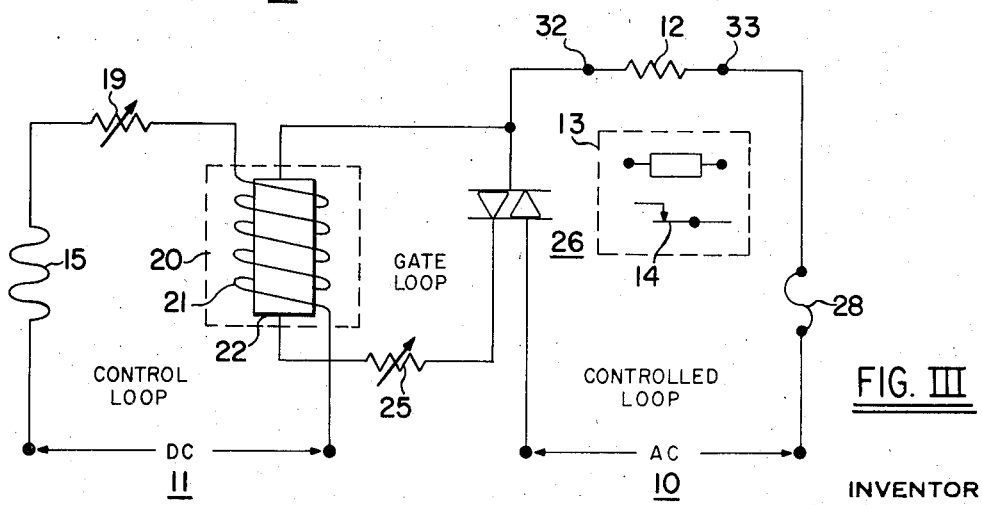
FIG. III
INVENTOR
WILLIS E. RIEMAN
BY
Kenneth E. Merklen
ATTORNEY

CONTROL CIRCUIT

The present invention relates to temperature sensitive heater element control circuits. More particularly the present invention is a triple level, temperature sensitive, adjustable, heater element control circuit employing magnetic coupling between the first and second levels, and gating control coupling between the second and third levels for controlling, on a positive "on" or "off" basis, the heater element of an oven or furnace.

The present temperature sensitive heater element control circuit has advantages over other circuits performing somewhat similar functions in that the present circuit is much less complex than normally used, is very stable and requires no adjustment after initial adjustment of the circuit components has been made. In addition to these advantages the components of the circuit which are not temperature responsive, are substantially temperature stable so that the circuit is insensitive to ambient temperature changes and in addition, is very inexpensive to build. The present control circuit has been found to work very well with trouble-free, long life expectancy, without gradual degeneration of the components of the circuit.

In its disclosed form the present invention includes a three loop or three level circuit arrangement in which the first loop or level is a temperature sensitive and responsive loop. This loop includes a heat or temperature sensor or responsive means, for example a thermistor, which is located in the temperature controlled environment. This may be an oven (as represented in the drawings) or some other environment such as a room or structure of any place or thing or mass in which it is desired to control the environmental temperature, or the temperature of the mass. Another component in the first loop is a temperature control, which in the present circuit is an adjustable resistor or potentiometer, which may be calibrated in degrees of heat. Another component of the first loop is a magnetic force generator, such as a coil. The first loop is driven by a direct current (DC) which is applied to the loop at all times during the time the circuit is turned on. The resistance-inductance values of this circuit are such that when the circuit is in a balanced condition the active resistance value of the circuit is such that the current flowing through the coil drives the coil to generate a magnetic force of predetermined intensity. The magnetic force is the coupling between the first and second loops of the circuit.

The third loop is the heater element control loop which is a controlled loop, from a functional sense. The controlled loop includes a gated switching element, the heater element or heater element control coupled in series with an alternating current (AC) sufficient to drive the heater element or the heater element control. The gated switch may, for example be a pair of back-to-back silicone controlled rectifiers (SCR'S) or a triac, with positive on/off control over the electric power driving the heater element.

The second loop may be referred to as a gate control loop. This circuit includes a pair of contacts, for example a reed relay, and a resistance connected in series with the reed relay across the gated switch, therefore serving as a gate control for the gated switch. The pair of contacts are magnetic sensitive, the second loop being magnetically coupled to the first loop functionally the pair of magnetic sensitive contacts are positioned in the magnetic field generated by the coil. The second loop is coupled to the third loop via its connection across the gated switch of the third loop.

The magnetic sensitive contacts of the second loop are physically controlled by the intensity or magnitude of the magnetic force generated by the coil while the gated switch is controlled by the physical position (opened or closed) of the pair of magnetic sensitive contacts to the extent that when the contacts are closed the gating circuit of the gated switch is closed thereby turning the switch "on" thus electrically completing the driving circuit for the heater element in the third loop. The intensity or magnitude of the magnetic force generated by the coil is a function of the DC input, the amount of turns in the coil and the active resistance in the first loop of the circuit. The magnetic force may be changed by holding the DC input stable and maintaining the number of turns in the coil the same and changing the active resistance in the first loop. The resistance in the first loop of the circuit may thus be changed by a change in the environment temperature thereby causing a change in the active resistance of the heat sensor or thermistor or temperature responsive resistor or, by manual adjustment of the adjustable resistance or potentiometer.

Therefore, it is an object of the present invention to provide an improved temperature sensitive heater element control circuit.

Another object is to provide an improved temperature sensitive heat control circuit having components, other than the heat sensing component, which are insensitive to ambient temperature change.

A further object is to provide an improved temperature sensitive, triple level heating element control circuit having trouble-free, long life expectancy.

These and other objects will become apparent when reading the following detailed specification in conjunction with the accompanying drawings in which:

FIG. 1 is a block diagram of the present invention;

FIG. 2 is a functional diagram helpful in understanding the invention and;

FIG. 3 is a simplified circuit diagram of the preferred form of the present invention.

Referring particularly to FIG. 1, it will be seen that an alternating current (AC) source 10 is provided for circuit operation. Some of the output of the AC source is rectified, in a conventional AC to DC rectifier, into a direct current (DC) 11. Other of the output of the AC source is used to drive the heater circuit. The presented embodiment employs electric energy to drive an electric heating element. In this arrangement the Heater Element 12 is energized by the AC source 10 under the control of a solid state switch (sss) 26. This AC source could be the usual 110 volt AC source or a 220 volt AC. The electric energy could be single phase or multi-phase energy. The type of electric energy used would depend upon the characteristics of the circuit components in the AC loop. In addition, the type of rectifier 11 would also depend upon the type of AC used.

The Heat Sensor, block 15 of FIGS. 1 and 2, is represented as a thermistor 15 in the circuit diagram of FIG. 3. The thermistor 15 is connected to one terminal of the DC 11, for example the positive output or terminal. FIG. 2 represents that the thermistor 15 is positioned in the controlled environment, here represented as an enclosed and insulated chamber 16, such as an oven, for example formed by a door 17 and the enclosing sides, top, bottom and end, 18. In the present arrangement a thermistor having a positive coefficient is employed, i.e., a thermistor which increases in resistance as the temperature of the environment in which it is positioned, increases.

It should be noted that the same components are given identical identification throughout the drawings.

The Temperature Control - Adjustable, block 19, may be a potentiometer (FIG. 3) and maybe remotely positioned or may be adjacently positioned, as for example, on the exterior of the environmental chamber (FIG. 2). The potentiometer 19 may be calibrated in degrees of heat, such as in Fahrenheit or Centigrade or intensity of heat, such as warm, medium, hot, very hot. Block 20 may be referred to as a duplex block since this block represents a coil 21 around an air core 22 in which is positioned a magnetic sensitive switch (mss). The other end of the coil is connected to the return or negative supply or terminal of the DC. This is one loop or circuit level and may be referred to as the CONTROL LOOP of the triple level control circuit.

Functionally, the recitified DC is maintained at a substantially stable level using conventional AC to DC rectification technology. As the thermistor 15 changes resistance due to a change in the environmental temperature in the oven, the current through the coil 21 changes thereby changing the intensity of the magnetic field generated about the coil. Any change in the electrical parameters of the components of the CONTROL LOOP will cause a change in the intensity of the magnetic field generated by the coil, thus effecting the magnetomotive force present around the coil. Assuming the DC values remain constant and the number of turns on the coil 21 remains constant, then, the value of active resistance in the temperature control 19 may be changed, by adjustment whether manual or automated for example, or the value of active resistance of the thermistor 15 may be changed by a change in the environmental temperature. A change in the active resistance in the first loop of the circuit will cause a change in the amount of current flow through the coil 21. A change in the current flow through coil 21 will change the amount or intensity of the magnetic force or flux generated by the coil 21.

Within the core 22 or positioned within the magnetic field generated by the coil 21 is a set of magnetic sensitive contacts, such as a magnetic responsive reed relay having at least two mating contacts which respond at a predetermined magnetic threshold, i.e., change condition (from normally opened to closed, from normally closed to opened, and from opened to normally closed or from closed to normally opened), when a sufficient magnetomotive force is present and/or is changed in intensity.

The magnetic responsive reed relay (not shown) may have threshold characteristics with respect to the intensity of the magnetic force generated by the coil 21. In this respect the sensitivity of the reed relay may be such that below a predetermined condition, for example open and at such threshold value of magnetic intensity, and above such threshold value, the reed relay contacts reverse their condition, for example close. A resistance 25 in series with reed relay adds balance and stability to the reed relay contact circuit, reducing contact migration between the two contact points and reducing arcing during movement of the contacts. The reed relay contacts are electrically isolated from the CONTROL LOOP, these contacts and resistor 25 forming part of what may be referred as a GATE LOOP since these components are connected across a gated switching component such as a pair of back-to-back silicone controlled rectifiers (SCR'S), 26 or a triac so as to provide a gate control circuit for the solid state switch, 26. The SCR S OR T HE TRIAC FUNCTION AS A SOLID STATE SWITCH WHICH IS IN THE CONTROLLED LOOP OF THE TRIPLE LEVEL CONTROL CIRCUIT. WHEN THE CONTACTS OF THE RELAY 22 ARE CLOSED, THE SOLID STATE SWITCH 26, IS CLOSED (OR THE "gate" is opened) to let current through to drive the heater element 12. A fuse 28 is represented in the circuit, of the CONTROLLED LOOP and an "on/off" switch 29 may be used to turn the entire circuit "on" or "off," as desired.

If the heat energy were other than electricity, as for example oil heat or gas heat, the heating element could be controlled by a contact 14, controlled by a relay 13 which relay would be coupled in the CONTROLLED LOOP instead of the heater element. The heater element 12 would be removed from the circuit at terminals 32 and 33 and the relay 13 would be connected to the terminals 32 and 33. The relay 13 and the contact 14 could be remote from the oil or gas heater unit and could be used in the oil heater circuit or gas heater circuit thereby providing positive on/off control of the oil heater unit or the gas heater unit. An alternative arrangement would be to connect the on/off electric control circuit of the oil or gas heater to the terminal 32 and 33 directly and thereby control the current supply as shown.

Thus there has been described a triple level, temperature sensitive adjustable heater element control circuit, with suggested modification for controlling various forms of heater elements. Other changes and substitutions that suggest themselves to those skilled in the art are intended to be included within the scope of the invention as defined by the appended claims.

What is claimed is:

1. A triple level control circuit for controlling a heat source in accordance with the environmental temperature of an enclosure including:
    an alternating current (AC) source,
    a direct current (DC) source
    a heat responsive resistive means, a potentiometer and a coil, serially coupled, and driven by said DC, forming a first loop,
    electrically controlled circuit gating means and heater element means serially connected across said AC source forming a second loop, and
    a pair of contacts magnetically coupled to but electrically isolated from said first loop and a resistor serially connected across said electrically controlled circuit gating means for controlling said gating means forming a third loop.

2. A triple level control circuit as in claim 1 and in which said
    heat responsive resistive means is a thermistor and is located in said enclosure for responding to the environmental temperature, said heater element means is located in said enclosure for elevating the temperature of the environment when driven by the AC source and
said potentiometer is located outside said enclosure.

3. A triple loop control circuit for controlling the temperature in an enclosed environment including:
an alternating current (AC) supply,
a direct current (DC) supply,
a temperature responsive sensing means adapted to change its electrical resistance characteristics proportionally in response to temperature change,
an inductance for generating a magnetic field having a magnitude which varies in accordance with the resistance in a first circuit,
variable resistance means for adjustably changing the resistance in said first circuit,
said temperature responsive sensing means and said inductance and said variable resistance means connected in series connection across said DC supply for forming a control loop,
a magnetic sensitive switch being magnetically coupled to said control loop,
solid state switch means adapted to be controlled by a gating circuit independent of the circuit of which the switch is a part but driven by energy passing through said switch,
a resistance connected in series with said magnetic sensitive switch for forming a gate loop and connected across said solid state switch means, and
a heater element connected in series with said solid state switch means connected across said AC supply for forming a controlled loop.

* * * * *